United States Patent [19]
Jungle

[11] 3,776,449
[45] Dec. 4, 1973

[54] WELDING MACHINE FOR CONNECTING TUBES TO A WALL

[75] Inventor: Nils Ake Curt Jungle, Goteborg, Sweden

[73] Assignee: Aktiebolaget Gotaverken, Goteborg, Sweden

[22] Filed: June 12, 1972

[21] Appl. No.: 261,931

[30] Foreign Application Priority Data
June 16, 1971 Sweden.............................. 7791/71

[52] U.S. Cl............ 228/29, 29/157.4 R, 29/202 R, 219/125, 228/32, 228/45
[51] Int. Cl.............................................. B23k 5/00
[58] Field of Search....................... 219/125; 228/25, 228/29, 32, 45; 29/157.4 R, 202 R

[56] References Cited
UNITED STATES PATENTS
| | | | |
|---|---|---|---|
| 2,908,805 | 10/1959 | Apblett et al................... | 219/125 R |
| 3,062,949 | 11/1962 | Lippart et al................... | 219/125 R |
| 3,215,812 | 11/1965 | Smith.............................. | 219/125 R |
| 3,389,846 | 6/1968 | Claffey................................. | 228/29 |
| 3,501,612 | 3/1970 | Denis.............................. | 219/125 R |

*Primary Examiner*—J. Spencer Overholser
*Assistant Examiner*—Robert J. Craig
*Attorney*—Ralph E. Parker et al.

[57] ABSTRACT

When fitting a large number of parallel tubes to the end plate of a heat exchanger in which each individual tube is pushed through a nipple in the end plate and reaches a considerable distance into the heat exchanger, certain difficulties are encountered in performing a satisfactory welding joint between the tube and the nipple. The space available is often limited and manual or even automatic welding by conventional machines is practically impossible. The disclosure proposes a machine which can easily be fitted around the tube, to be carried thereby and retained by simple means in the proper position adjacent to the part of the tube to be welded. The machine includes a welding torch and means for rotating the same around the tube.

1 Claim, 2 Drawing Figures

PATENTED DEC 4 1973  3,776,449

WELDING MACHINE FOR CONNECTING TUBES TO A WALL

BACKGROUND OF THE INVENTION

In certain heat exchangers it is desirable to be able to attach a large number of tubes close by each other to a wall. The space available between the individual tubes will then be limited, and customarily a welding machine is used, which is carried by the tube and in suitable manner is made automatically to rotate around the same.

A necessary requirement has hitherto been that the machine could be governed by means extending down into the tube, or which possibly could co-operate with the upper end on adjacent tube. There are, however, embodiments where it is desirable to weld the tube to a nipple extending outwards from the wall, and where the tube has such an extension outside the nipple, that it is impossible to utilize the inside of the tube or an adjacent tube for guiding purposes.

SUMMARY OF THE INVENTION

The aim of the present invention is to propose a machine which makes it possible to weld tubes of optional length to a nipple, and the invention is characterized in a carrier provided with a longitudinal passage enclosing the tube with a clearance, two annuli each having a wedge-shaped cross section, the internal diameter of the annuli corresponding to the external diameter of the tube, said annuli being designed to be mounted on the tube with the pointed ends of the wedges turned towards each other and to be forced into the passage in the carrier from both ends thereof, an external toothed ring at each end of the carrier, at least two annular guides on the external envelope surface of the carrier intermediate the toothed rings, and a sleeve running on said guides and carrying the welding equipment as well as a driving motor which by way of gear transmission co-operates with the toothed rings on the carrier.

SHORT DESCRIPTION OF THE DRAWING

FIG. 1 shows a section through the lower part of a pressure vessel into which a number of tubes extend, and FIG. 2 shows a view, partly in section, of the welding machine working on the tube.

DESCRIPTION OF THE PREFERRED EMBODIMENT

Figure 1:
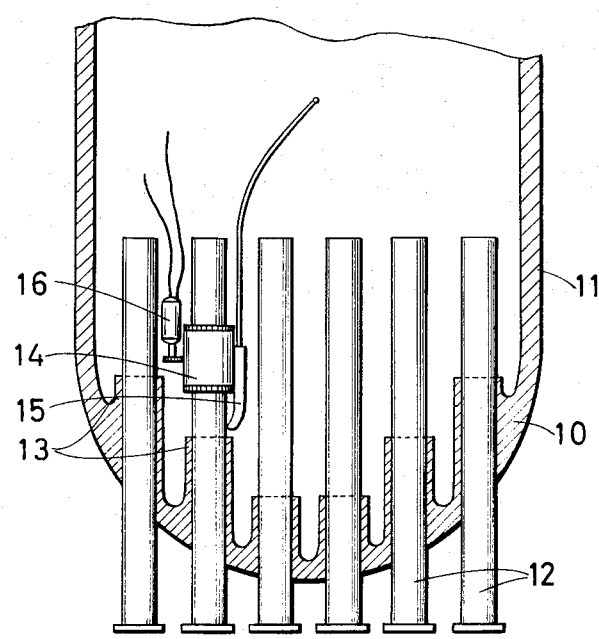

A number of tubes 12 are intended to be attached by welding to one end plate 10 of the shell 11 of a heat exchanger. The end plate is provided with nipples 13 extending into the heat exchanger, and into each of these nipples a tube 12 entered in such a manner that it will reach a considerable distance into the shell, past the inner end of the nipple. The end plate is concave and the nipples thus will be located at different levels. The tubes extend into the shell by different lengths in such a manner that the ends of the tubes will be located in a common plane.

In order to make possible a welding of the tubes to the nipples a machine of the type generally denoted by 14 in FIG. 1 is used, which comprises a welding torch 15 and a driving motor 16 by means of which the machine may be brought to rotate around the tube within the limited space available between the occasionally actual tube and the tubes already fitted. Preferably the welding operation starts at the centre of the end plate, and thereafter the tubes are welded in turn in direction outwards.

Figure 2:
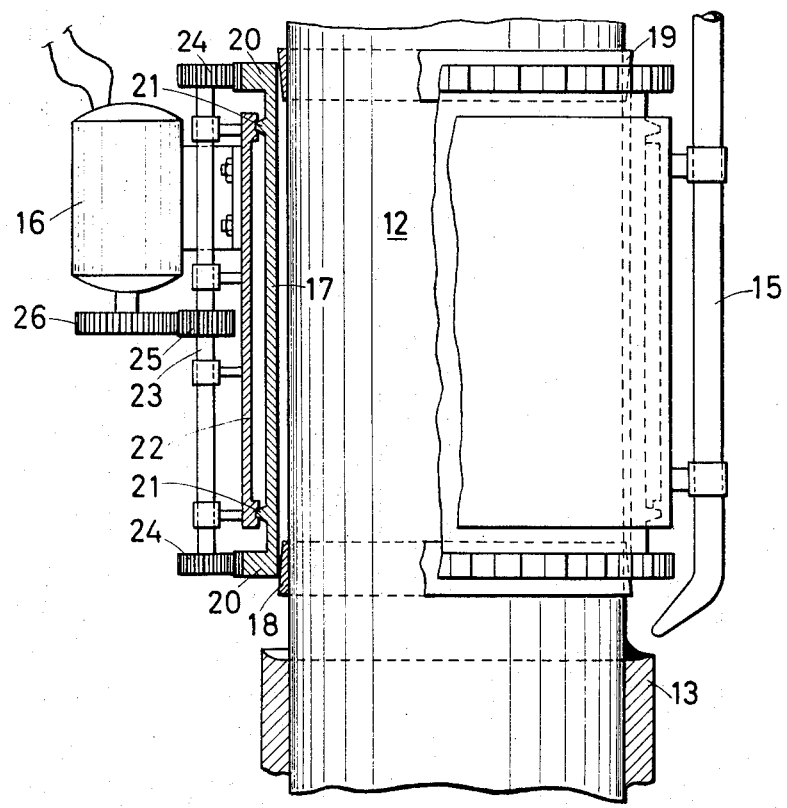

As is shown in FIG. 2 the welding apparatus consists of a tubular carrier 17 provided with a passage having an internal diameter which is slightly bigger than the external diameter of the tube. This carrier may be fitted around the tube and in order to obtain a satisfactory welding seam it is necessary that the carrier is exactly centered with respect to the tube, and also that it may be easily adjusted in the longitudinal direction thereof.

This is brought about by means of two annuli 18 and 19, each having a wedge-shaped cross section. The internal cylindrical envelope surface of these annuli has a diameter which closely corresponds to the external diameter of the tube, and these annuli are mounted on the tube in such a manner that the pointed ends of the wedges will be turned towards each other. Annulus 18, thus, is first mounted upon the tube, then the carrier 17, and finally the second annulus 19. The lowermost annulus 18 is retained in a desired position above the nipple, and the carrier is lowered upon the same, and when finally the annuli are forced into the passage in the carrier the latter will be exactly centered with respect to the tube, while it simultaneously will be locked at the desired position above the nipple. A possible fine-adjustment of the welding torch 15 with respect to the nipple 13 may then be performed by means of a device (not shown) fitted to the carrier.

The carrier 17 is at its upper and its lower end, respectively, provided with a toothed ring 20 and intermediate these with two peripheral, ring-shaped guides 21. A sleeve 22 co-operates with these guides and the driving motor 16 mentioned earlier is mounted on this sleeve which also supports a gear transmission, comprising a shaft 23, two toothed pinions 24, 24 co-operating with the toothed rings 20 and a gear wheel 25 co-operating with the pinion 26 at the driving motor. When this is operating sleeve 22 will be rotated with a speed suited to the welding apparatus in such a manner that the desired welding seam is obtained.

I claim:

1. In a welding machine, including at least one welding torch, for connecting a tube to a nipple extending outwards from a wall in a device where there is limited space available around the nipple and the tube is so long that no guiding of the machine by means of members co-operating with the inside of the tube can be arranged, the combination of
    a carrier in the form of a closed cylindrical element providing a longitudinal passage having an internal diameter greater than is the external diameter of said tube, said passage thus enclosing the tube with a clearance;
    two annular members each having a wedge-shaped cross-section, the internal diameter of the annular members corresponding to the external diameter of the tube, said annular members being designed to be mounted on the tube with the narrow ends of the wedge-shaped cross-section turned towards each other and to be forced into the passage in the carrier from opposite ends thereof;
    two external toothed rings disposed at opposite ends of the carrier,
    at least two external annular guides on the carrier intermediate the toothed rings, a sleeve running on said annular guides and carrying said welding torch; and
driving means including a driving motor and associated gear transmission which driving means is mounted on said sleeve and co-operates with the toothed rings on the carrier to rotate said sleeve about the tube.

* * * * *